(12) United States Patent
Helmrich et al.

(10) Patent No.: US 11,973,961 B2
(45) Date of Patent: Apr. 30, 2024

(54) ENCODER, DECODER AND METHODS FOR ENHANCING A ROBUSTNESS FOR CALCULATION OF CROSS-COMPONENT LINEAR MODEL PARAMETERS

(71) Applicant: Fraunhofer-Gesellschaft zur Förderung der angewandten Forschung e.V., Munich (DE)

(72) Inventors: Christian Helmrich, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 261 days.

(21) Appl. No.: 17/337,898

(22) Filed: Jun. 3, 2021

(65) Prior Publication Data

US 2021/0289215 A1    Sep. 16, 2021

Related U.S. Application Data

(63) Continuation of application No. PCT/EP2019/083999, filed on Dec. 6, 2019.

(30) Foreign Application Priority Data

Dec. 7, 2018    (EP) .................................... 18211107

(51) Int. Cl.
*H04N 19/176*    (2014.01)
*H04N 19/107*    (2014.01)
(Continued)

(52) U.S. Cl.
CPC ......... *H04N 19/176* (2014.11); *H04N 19/107* (2014.11); *H04N 19/132* (2014.11);
(Continued)

(58) Field of Classification Search
CPC .................................................... H04N 19/176
(Continued)

(56) References Cited

U.S. PATENT DOCUMENTS

| 2018/0077426 A1* | 3/2018 | Zhang | H04N 19/157 |
| 2021/0067802 A1* | 3/2021 | Jin | H04N 19/176 |

FOREIGN PATENT DOCUMENTS

| WO | 2017/214420 A1 | 12/2017 |
| WO | 2020015647 A1 | 1/2020 |
| WO | 2020015648 A1 | 1/2020 |

OTHER PUBLICATIONS

Ma, Xiang; "CE3-related: Classification-based Mean Value for CCLM Coefficients Derivation"; JVET-L0342-r2; Oct. 3-12, 2018; 7 pages.

(Continued)

*Primary Examiner* — Yulin Sun
(74) *Attorney, Agent, or Firm* — Conley Rose, P.C.

(57) ABSTRACT

A decoder for block-based decoding of picture data of a picture is configured to decode a current block of the picture by determining first and second sets of luma in a neighborhood of the current block, the first set of luma samples having smaller luma values than the second set of luma samples, fitting a straight-line having a linear function through first and second pairs of luma-chroma samples, wherein the first and second pairs of luma-chroma samples are determined based on the first and second sets of luma samples, respectively, and on first and second corresponding chroma samples, respectively, in said neighborhood of the current block, and predicting chroma samples of the current block using luma samples of the current block and said linear function. The present proposal further concerns a respective encoder and corresponding methods for encoding and decoding.

14 Claims, 8 Drawing Sheets

(51) Int. Cl.
*H04N 19/132* (2014.01)
*H04N 19/136* (2014.01)
*H04N 19/186* (2014.01)
*H04N 19/503* (2014.01)
*H04N 19/593* (2014.01)

(52) U.S. Cl.
CPC ......... *H04N 19/136* (2014.11); *H04N 19/186* (2014.11); *H04N 19/503* (2014.11); *H04N 19/593* (2014.11)

(58) Field of Classification Search
USPC .................................................. 375/240.13
See application file for complete search history.

(56) References Cited

OTHER PUBLICATIONS

K. Zhang et al., "Enhanced cross-component linear model intra-prediction," 4.JVET—Meeting Chengdou, Oct. 2016, pp. 1-6, http://phenix.it-sudparis.eu/jvet/doc_end_user/current_document.php?id=2806-.

G. Laroche et al., "CE3-5.1: Cross-component linear model simplification," 12.JVET—Meeting, Macao; (The Joint Video Exploration Team of ISO/IEC JTC1/SC29/WG11 and ITU-T SG.16 Lno. JV ET-L0191, Oct. 7, 2018, pp. 1-4, XP030195195 L0191,2018.

B. Bross et al., "Versatile Video Coding (Draft 2)," JVET-K1001, ver. 6/7, Sep./Oct. 2018.

Fraunhofer HHI, VVCSoftware_VTM, https://vcgit.hhi.fraunhofer.de/jvet/ VVCSoftware_ VTM.

F. Bossen et al., "JVET common test conditions and software reference configurations for SDR video," JVET-L1010, 2018.

G. Bjøntegaard, "Calculation of average PSNR differences between RD-curves", pp. 1-4, VCEG-M33, 2001.

Anonymous, "Curve fitting—Wikipedia", Sep. 5, 2018 (Sep. 5, 2018), XP055670272, Retrieved from the Internet: URL:https://en.wikipedia.org/w/index.php?title=Curve fitting&oldid=858223726.,[retrieved-on Feb. 19, 2020], p. 3.

Choi Jangwon et al., "CE3-related: Reduced number of reference samples for CCLM parameter calculation", 12th JVET Meeting, Oct. 3, 2018-Oct. 12, 2018; Macao; (The Joint Video Exploration Team of ISO/IEC JTC1/SC29/WG11 and ITU-T SG.16 L No. JV ET-L0138, Oct. 6, 2018 (Oct. 6, 2018), XP030195031, Retrieved from the Internet: URL:http://pheni x.int-evry .fr/jvet/doc end user/ documents/12 Macao/wgll/JV ET- L0138-v 3.zip JV ET- L0138v2.docx.

Christian Helmrich, "Improved robustness for calculation of cross-component linear model parameters", Joint Video Experts Team (JVET) of ITU-T SG 16 WP 3 and ISO/IEC JTC 1/SC 29/WG , 13th Meeting: Marrakech, MA, Jan. 9-18, 2019.

Meng Wang et al., "CE3-related: Modified linear model derivation for CCLM modes", Joint Video Experts Team (JVET), Jan. 3, 2019, [JVET-M0274] (version 1) Nov. 13, 2023.

* cited by examiner

ENCODER, DECODER AND METHODS FOR ENHANCING A ROBUSTNESS FOR CALCULATION OF CROSS-COMPONENT LINEAR MODEL PARAMETERS

CROSS-REFERENCES TO RELATED APPLICATIONS

This application is a continuation of copending International Application No. PCT/EP2019/083999, filed Dec. 6, 2019, which is incorporated herein by reference in its entirety, and additionally claims priority from European Application No. EP 18211107.0, filed Dec. 7, 2018, which is incorporated herein by reference in its entirety.

Embodiments of the present invention relate to a decoder for block-based decoding and an encoder for block-based encoding of picture data of a picture, both comprising inventive features for enhancing a robustness for calculation of cross-component linear model parameters. Further embodiments relate to corresponding methods for block-based decoding and block-based encoding of picture data of a picture making use of said inventive features, as well as to a computer readable digital storage medium having stored thereon a computer program having a program code for performing, when running on a computer, at least one of said methods for block-based encoding and block-based decoding. Some embodiments may reside in the field of line fitting algorithms, and in particular in the field of cross-component linear model (CCLM) prediction.

BACKGROUND OF THE INVENTION

Cross-component linear model (CCLM) prediction is a coding tool allowing to exploit statistical redundancies in the coding of multiple signal channels (here, luminance/luma and chromatic/chroma picture planes). Traditionally, the CCLM predictor parameters $\alpha$ and $\beta$ are derived via linear regression methods attempting a least mean squares (LMS) approximation of the data points (here, pairs of luma-chroma sample values) [x, y] by a straight line $y=\alpha \cdot x+\beta$, as illustrated in FIG. 8.

In case of image and video coding, such an approach can be used to predict a chroma sample value y from already coded luma sample value(s) x, thus achieving increased coding efficiency on many input sequences [1], [2]. Since the computational complexity of linear-regression based line-fitting algorithms is quite high especially in picture coding, a simplified line fitting was recently proposed in [2] (also referred to as JVET-L0191 in the following) and subsequently adopted into the VVC draft specification [3].

According to [2], instead of determining the straight line from all available luma-chroma sample pairs, this proposal fits the line only between one data point A with the minimum luma value and one data point B with the maximum luma value. This reduces the number of operations (particularly multiplications) that may be performed by the algorithm, leaving the search for the local luma minimum and maximum as the major operations of the CCLM method. Note that the actual CCLM prediction, which uses more operations than the model calculation at medium and large CUs (since it is carried out for each chroma sample in the CU) is not affected by the simplification.

According to JVET-L0191, the simplified CCLM calculations save about 80 lines of source code and reduce the decoding runtime in the random-access and low-delay B configurations by a few percent. Unfortunately, losses in chromatic coding efficiency of up to about 1% for UHD content (class A) are reported as well [2], which can be attributed to the increased susceptibility of the simplified CCLM fitting algorithm to statistical outliers: strong variances in the extreme values (minimum A and maximum B) relative to the remaining set of luma-chroma points are much more likely to result in inaccurate line-fittings than in LMS-based CCLM. In fact, such a scenario is depicted in FIG. 8 taken from JVET-L0191, wherein the solid line does not fit the data very well—i.e., almost all remaining luma-chroma pairs between A and B end up underneath the fitted line.

SUMMARY

One embodiment may have a decoder for block-based decoding of picture data of a picture, the decoder being configured to decode a current block of the picture by
    determining a first set of luma samples and a second set of luma samples in a neighborhood of the current block, the first set of luma samples having smaller luma values than the second set of luma samples,
    fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block, and
    predicting chroma samples of the current block using luma samples of the current block and said linear function.

One embodiment may have an encoder for block-based encoding of picture data of a picture into a data stream, the encoder being configured to encode a current block of the picture by
    determining a first set of luma samples and a second set of luma samples in a neighborhood of the current block, the first set of luma samples having smaller luma values than the second set of luma samples,
    fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block, and
    predicting chroma samples of the current block using luma samples of the current block and said linear function.

According to an embodiment, a method for block-based decoding of picture data of a picture, wherein decoding a current block of the picture may have the steps of:
    determining a first set of luma samples and a second set of luma samples in a neighborhood of the current block, the first set of luma samples having smaller luma values than the second set of luma samples,
    fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block, and predicting chroma samples of the current block using luma samples of the current block and said linear function.

According to another embodiment, a method for block-based encoding of picture data of a picture, wherein encoding a current block of the picture may have the steps of:

determining a first set of luma samples and a second set of luma samples in a neighborhood of the current block, the first set of luma samples having smaller luma values than the second set of luma samples, fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block, and predicting chroma samples of the current block using luma samples of the current block and said linear function.

Another embodiment may have a non-transitory digital storage medium having a computer program stored thereon to perform the inventive methods when said computer program is run by a computer.

Yet another embodiment may have a data stream obtained by an inventive method.

A first embodiment concerns a decoder for block-based decoding of picture data of a picture. The decoder is configured to decode a current block of the picture by predicting chroma samples of the current block relative to luma samples of the current block using a linear function. Said linear function may be determined based on a neighborhood, e.g. a neighboring block. In particular, said linear function may be determined based on pairs of luma-chroma samples in said neighborhood.

Such a pair of luma-chroma samples may comprise a luma sample and a corresponding, e.g. colocated, chroma sample. More generally, said pair may comprise at least one luma sample and a corresponding, e.g. co-located, chroma sample; this is the case with downsampled chroma representations, where only one chroma sample may be available for two (4:2:2 downsampling) or four (4:2:0 downsampling) co-located luma samples. In other words, to obtain a pair of luma-chroma samples in case of chroma-downsampled input, implicit intermediate luma downsampling may be performed while forming said pair of luma-chroma samples so that the resulting pair comprises, for the sake of simplicity, exactly one (implicitly downsampled) luma sample and one corresponding, e.g. co-located (explicitly downsampled) chroma sample; see [1]. For obtaining a pair of luma-chroma samples in the neighborhood, the decoder is configured to determine a first set of luma samples and a second set of luma samples in said neighborhood of the current block. The first set of luma samples and the second set of luma samples may each comprise a plurality, e.g. two or more, luma samples. The luma samples contained in the first set of luma samples comprise smaller luma values than the luma samples contained in the second set of luma samples. In other words, the first set of luma samples may comprise a plurality of small-valued luma samples, while the second set of luma samples may comprise a plurality of large-valued luma samples. A luma sample and a corresponding chroma sample in said neighborhood may together form a pair of luma-chroma samples within said neighborhood. Since the first set of luma samples may comprise a plurality of small-valued luma samples, a corresponding plurality of pairs of luma-chroma samples having a small luma value may be available, which pairs may also be referred to as first pairs of luma-chroma samples. In turn, since the second set of luma samples may comprise a plurality of high-valued luma samples, a corresponding plurality of pairs of luma-chroma samples having a high luma value may be available, which pairs may also be referred to as second pairs of luma-chroma samples. In other words, a plurality of first pairs of luma-chroma samples and a plurality of second pairs of luma-chroma samples may be available, wherein the first pairs of luma-chroma samples comprise luma samples having smaller luma values than the luma samples comprised by the second pairs of luma-chroma samples. Summarizing, the first pairs of luma-chroma samples may be determined based on the first set of luma samples and first corresponding (e.g. co-located) chroma samples in said neighborhood of the current block, and the second pairs of luma-chroma samples may be determined based on the second set of luma samples and second corresponding (e.g. co-located) chroma samples in said neighborhood of the current block. According to the inventive principle, the decoder is configured to fit a straight-line having a linear function through first pairs (e.g. through at least two first pairs) of luma-chroma samples and second pairs (e.g. at least two second pairs) of luma-chroma samples according to a straight-line fitting algorithm. The straight-line itself does not necessarily need to touch the plurality of first and second pairs of luma-chroma samples. Stated in more general terms, it may rather be understood as fitting a line through a point cloud, wherein the first and second pairs of luma-chroma samples represent points in said point cloud. Accordingly, fitting the straight line through a plurality of pairs of luma-chroma samples can be synonymously understood as calculating the linear function of said straight-line, wherein said calculation is based on said first pairs and second pairs of luma-chroma samples. The decoder is configured to use this linear function, which was gathered in the neighborhood of the current block, for the prediction of current chroma samples in the current block relative to current luma samples of the current block. Since the inventive concept uses more than one pair of first pairs of luma-chroma samples and more than one pair of second pairs of luma-chroma samples for calculating the linear function, the straight-line fitting according to the inventive principle has a decreased susceptibility to statistical outliers.

A second embodiment concerns an encoder for block-based encoding of picture data of a picture into a data stream, the encoder being configured to encode a current block of the picture by determining a first set of luma samples and a second set of luma samples in a neighborhood of the current block, the first set of luma samples having a smaller luma value than the second set of luma samples. The encoder may further be configured to fit a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block. The encoder may further be configured to predict chroma samples of the current block using luma samples of the current block and said linear function. In order to avoid repetition, it is referred to the description of the decoder above regarding the advantages of the inventive encoder.

A third embodiment concerns a method for block-based decoding of picture data of a picture, wherein decoding a current block of the picture comprises a step of determining a first set of luma samples and a second set of luma samples in a neighborhood of the current block, the first set of luma samples having smaller luma values than the second set of luma samples. The method comprises a further step of fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block. The method further comprises a step of predicting chroma samples of the current block using luma samples of the current block and said linear function. In order to avoid repetition, it is referred to the description of the decoder above regarding the advantages of the inventive method for decoding.

A fourth embodiment concerns a method for block-based encoding of picture data of a picture, wherein encoding a current block of the picture comprises a step of determining a first set of luma samples and a second set of luma samples in a neighborhood of the current block, the first set of luma samples having a smaller luma value than the second set of luma samples. The method comprises a further step of fitting a straight-line having a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block. The method comprises a further step of predicting chroma samples of the current block using luma samples of the current block and said linear function. In order to avoid repetition, it is referred to the description of the decoder above regarding the advantages of the inventive method for encoding.

According to a fifth embodiment computer programs are provided, wherein each of the computer programs is configured to implement one of the above-described methods when being executed on a computer or signal processor, so that the above-described methods are implemented by one of the computer programs.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
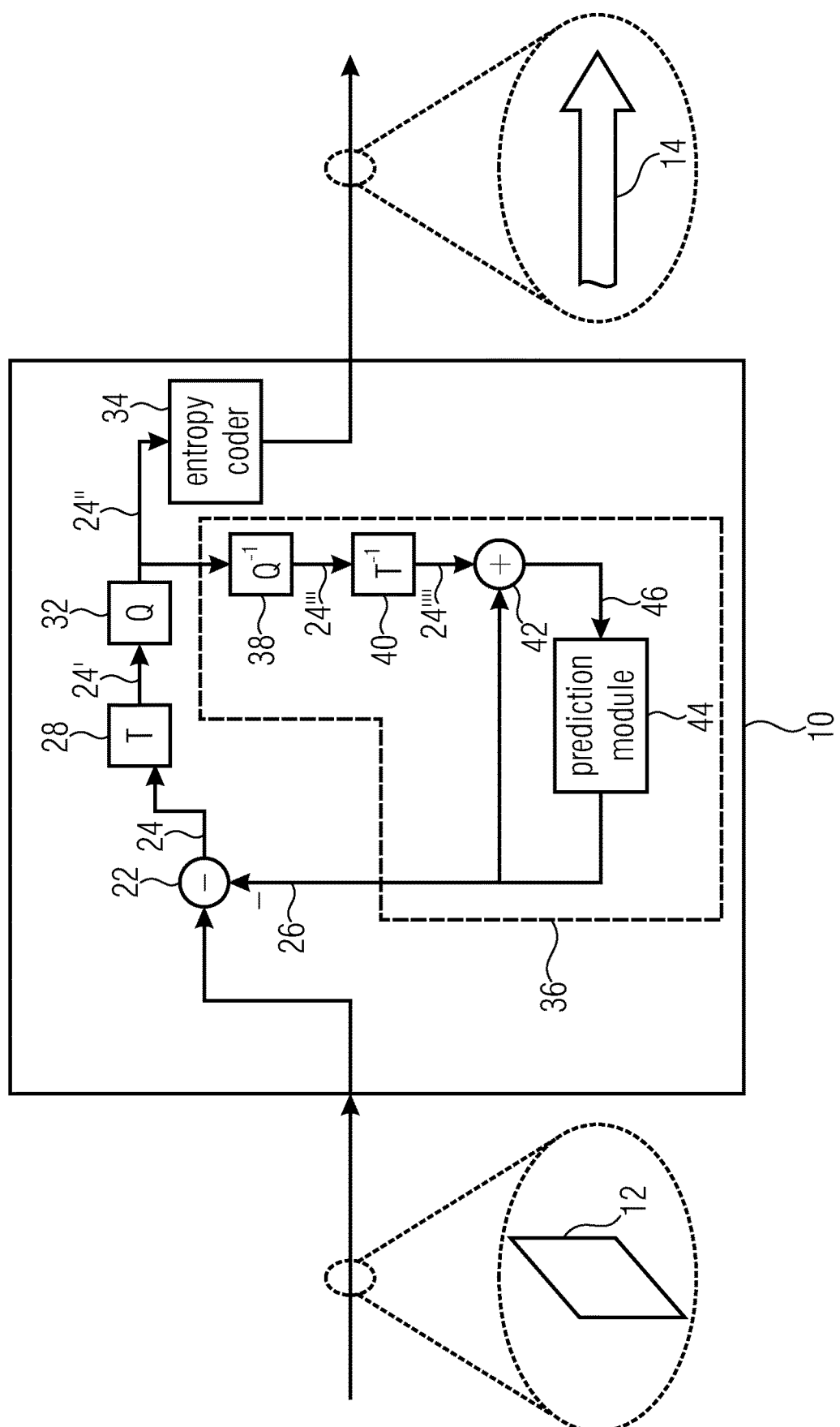
FIG. 1 shows a schematic block diagram of an apparatus for predictively coding a picture as an example for an encoder where an intra prediction concept according to embodiments of the present application could be implemented.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
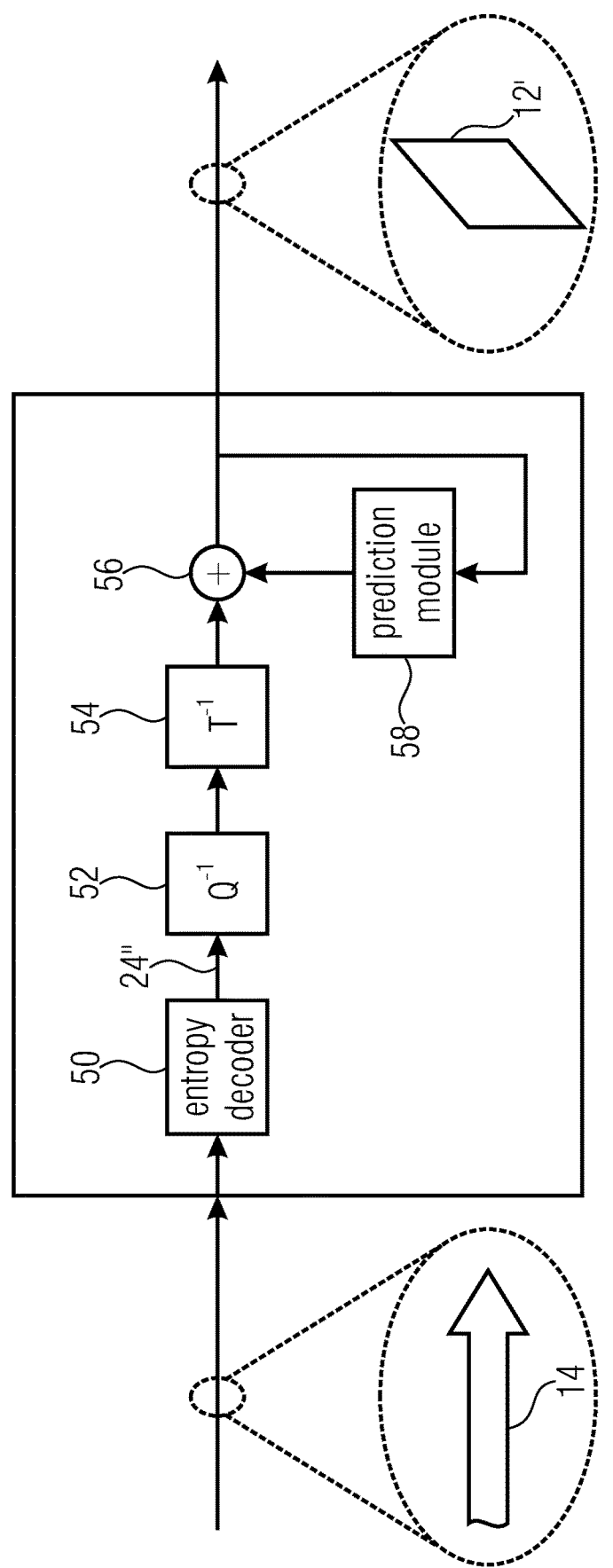
FIG. 2 shows a schematic block diagram of an apparatus for predictively decoding a picture, which fits to the apparatus of FIG. 1, as an example for a decoder where an intra prediction concept according to embodiments of the present application could be implemented.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24"', which corresponds to signal 24' except for quantization loss, followed by an inverse transformer 40 which subjects the latter prediction residual signal 24"' to an inverse transformation, i.e. a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction. Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intracoding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
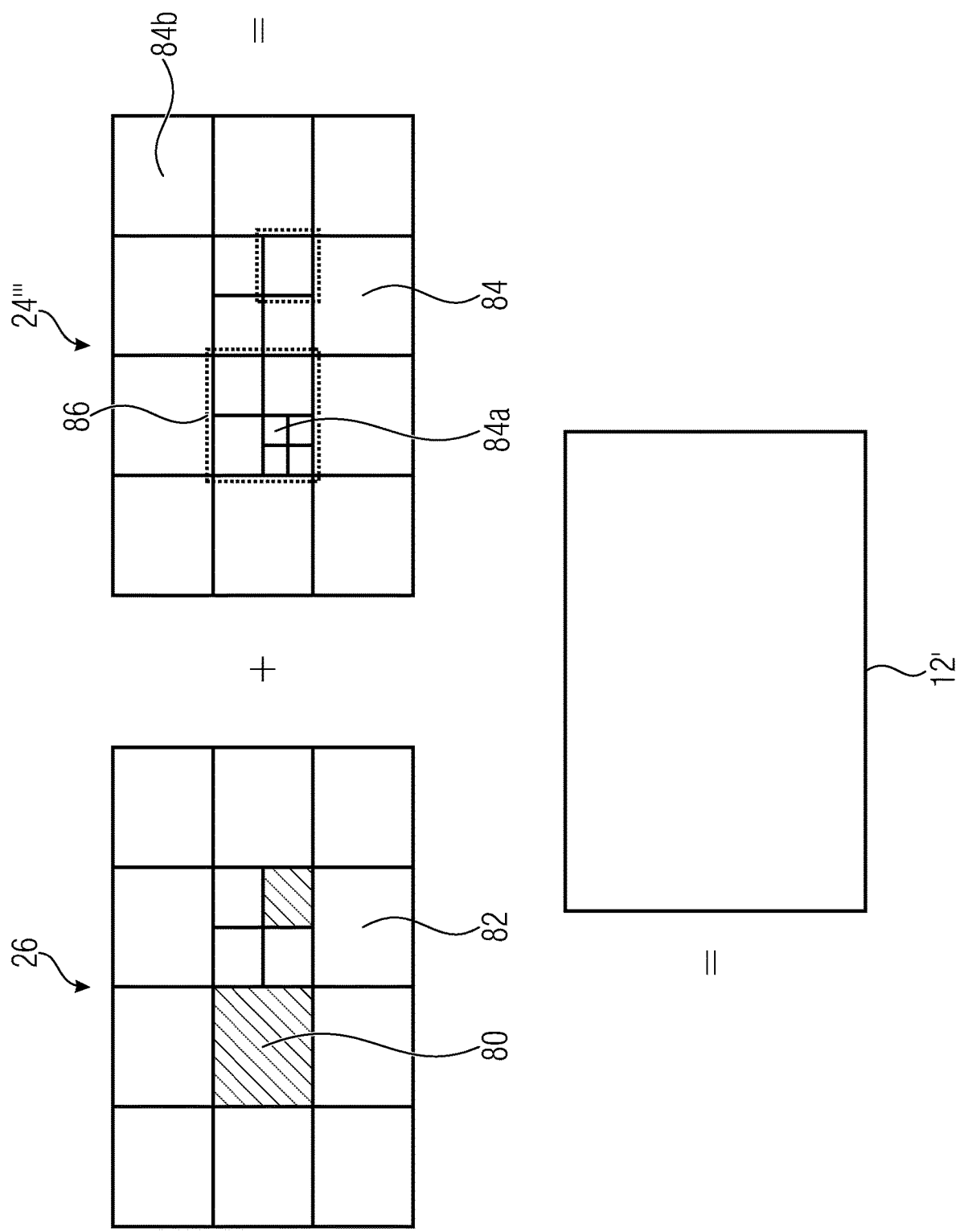
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

In the following, some examples and embodiments will be discussed in order to exemplarily describe how embodiments of encoders 10 for block-based encoding and embodiments of decoders 20 for block-based decoding may exploit the inventive principle described herein. In particular, it will be described how to predict, in a current block, a chroma sample value from already coded luma sample value(s) using the inventive principle, i.e. using a linear function that is obtainable by luma-chroma samples of a neighboring block. Even though examples of decoders 20 may be described in the following, the same is also valid for corresponding examples of encoders 10.

Figure 4:
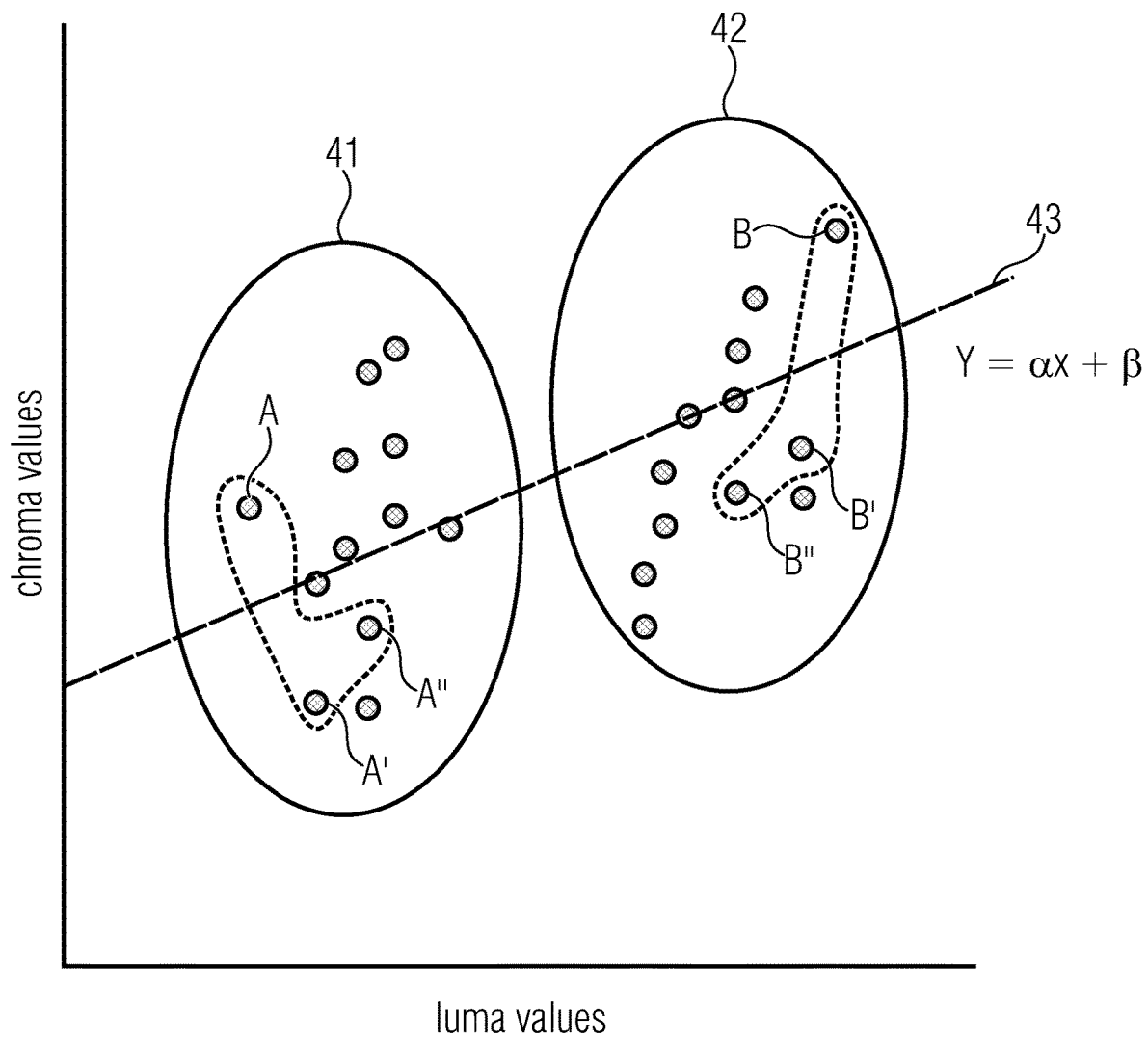
FIG. 4 shows an example of a plurality of first and second pairs of luma-chroma samples which may be potentially used by the encoder and/or decoder for the straight-line fitting according to embodiments.

FIG. 4 shows a scatter plot of an accumulation of pairs of luma-chroma samples that have been gathered in a neighborhood of a current block. Said neighborhood may be a neighboring block in the direct vicinity of the current block, or even a neighboring block in the further vicinity of the current block, i.e. with one or more blocks therebetween.

Initially, it shall be explained how the encoder 10 and/or decoder 20 may obtain the above mentioned pairs of luma-chroma samples. Therefore, the encoder 10 and/or decoder 20 may be configured to determine a first set of luma samples in said neighborhood of the current block, and to determine a second set of luma samples in said neighborhood. Said first set may comprise a plurality, e.g. at least two, luma samples having different luma values. Said second set may also comprise a plurality, e.g. at least two, luma samples having different luma values. However, the luma samples contained in the first set may be distinguished from the luma samples contained in the second set by their respective luma values. In particular, the luma samples contained in the first set may have smaller luma values than the luma samples contained in the second set.

One or more chroma samples may be linked with the luma samples of the first set and of the second set, respectively. Accordingly, a respective number of pairs of luma-chroma samples may be obtainable by the encoder 10 and/or decoder 20 by linking a luma sample with a corresponding chroma sample. These pairs of luma-chroma samples may then be categorized based on their respective luma value.

For example, pairs of luma-chroma samples which comprise luma samples of the first set of luma samples (i.e. those with the smaller luma values) may be categorized as first pairs of luma-chroma samples. In turn, pairs of luma-chroma samples which comprise luma samples of the second set of luma samples (i.e. those with the larger luma values) may be categorized as second pairs of luma-chroma samples.

FIG. 4 shows a plurality of first pairs of luma-chroma samples which are symbolically encircled by the schematic oval 41, as well as a plurality of second pairs of luma-chroma samples which are symbolically encircled in the schematic oval 42. In this non-limiting example, three first pairs of luma-chroma samples A, A', A" and three second pairs of luma-chroma samples B, B', B" may be determined by the encoder 10 and/or decoder 20 for the following line-fitting step.

Again, the luma values of the first pairs of luma-chroma samples A, A', A" are smaller than the luma values of the second pairs of luma-chroma samples B, B', B". This can be seen in the depicted scatter plot since the x-axis represents the respective luma value of the pairs of luma-chroma samples, while the y-axis represents the corresponding chroma value of the respective pair of luma-chroma samples. Accordingly, each pair of luma-chroma samples A, A', A", B, B', B" comprises a luma sample value and a corresponding chroma sample value.

The encoder 10 and/or decoder 20 may further be configured to fit a straight-line 43 through the scatter plot depicted in FIG. 4. Basically, said depicted scatter plot may be comparable with a point cloud wherein each of the first and second pairs of luma-chroma samples A, A', A", B, B', B" may correspond to a point inside said point cloud.

The encoder 10 and/or decoder 20 may fit said straight-line 43 through the exemplarily selected three first pairs of luma-chroma samples A, A', A" and through the exemplarily selected three second pairs of luma-chroma samples B, B', B". For example, the encoder 10 and/or decoder 20 may use the three first pairs of luma-chroma samples A, A', A" and the three second pairs of luma-chroma samples B, B', B" as a calculation basis for the straight-line fitting algorithm for fitting the straight-line 43 through said point cloud.

As can be seen, the straight-line 43 does not need to necessarily touch or even extend through one or more of the first and/or second pairs of luma-chroma samples A, A', A", B, B', B". Instead, fitting the straight-line 43 through the first and/or second pairs of luma-chroma samples A, A', A", B, B', B" shall rather be understood in a sense that the fitting algorithm itself is based on said selected number of first and/or second pairs of luma-chroma samples A, A', A", B, B', B" leading to the linear function of the straight-line 43 as depicted.

The straight-line 43 depicted in FIG. 4 is to be understood as a rather schematic construct in order to visualize the discussed straight-line fitting algorithm. One important information that can be derived from said straight-line fitting is the linear function of the straight-line 43. The linear function may be given by the equation:

$$y = \alpha \cdot x + \beta$$

wherein $\alpha$ is a first cross-component linear model parameter representing a slope of said straight-line 43 and $\beta$ is a second cross-component linear model parameter representing an offset of said straight-line 43.

According to the invention, the encoder 10 and/or decoder 20 is configured to predict for a current luma sample x of a current block a corresponding chroma sample y of the current block by means of the linear function which has been determined from the neighborhood of said current block, as explained above.

According to an embodiment, the decoder 20 may be configured to reconstruct the luma samples of the current block by intra prediction and/or by inter prediction. According to yet a further embodiment, the decoder 20 may be configured to decode luma sample residuals for the current block from a data stream 14, and to reconstruct the luma samples of the current block by intra prediction and/or inter prediction to obtain predicted luma samples and correcting said predicted luma samples using the luma sample residuals.

Accordingly, an embodiment provides a respective encoder 10 which is configured to encode luma sample residuals for the current block into the data stream 14, so that the luma samples of the current block are reconstructable by intra prediction and/or inter prediction to obtain predicted luma samples, wherein said predicted luma samples are correctable by using the luma sample residuals.

In the above example, three first pairs of luma-chroma samples A, A', A" and three second pairs of luma-chroma samples B, B', B" were exemplarily used as a basis for the fitting algorithm for fitting the straight-line 43 through at least these three first and second pairs of luma-chroma samples A, A', A", B, B', B". However, more than the exemplarily described three first and second pairs of luma-chroma samples A, A', A", B, B', B" may be used in the inventive principle. Additionally or alternatively, only two first and second pairs of luma-chroma samples A, A', B, B' may be used in the inventive principle. However, at least two first pairs of luma-chroma samples A, A' and at least two second pairs of luma-chroma samples B, B' are to be used according to the inventive principle.

This is an important distinguishing feature over JVET-L0191 in which only one first pair of luma chroma samples A and only one second pair of luma-chroma samples B are used.

For example, the encoder 10 and/or decoder 20 may be configured to choose those two or more first luma-chroma samples A, A', A" which have the smallest luma values. Therefore, the encoder 10 and/or decoder 20 may be configured to determine the first set of luma samples by finding n>1 smallest luma values in said neighborhood of the current block. Together with the corresponding chroma values, those n>1 first pairs of luma-chroma samples A, A', A" having the smallest luma values may be selected out of the plurality 41 of first pairs of luma-chroma samples by the encoder 10 and/or decoder 20.

Additionally or alternatively, the encoder 10 and/or decoder 20 may be configured to choose those two or more second luma-chroma samples B, B', B" which have the largest luma values. Therefore, the encoder 10 and/or decoder 20 may be configured to determine the second set of luma samples by finding n>1 largest luma values in said neighborhood of the current block. Together with the corresponding chroma values, those n>1 second pairs of luma-chroma samples B, B', B" having the smallest luma values may be selected out of the plurality 42 of second pairs of luma-chroma samples by the encoder 10 and/or decoder 20.

As mentioned above, at least two, and according to some exemplary embodiments exactly two first pairs of luma-chroma samples A, A' having the smallest luma values may be selected from the plurality 41 of first pairs of luma-chroma samples. Furthermore, at least two, and according to some exemplary embodiments exactly two second pairs of luma-chroma samples B, B' having the largest luma values may be selected from the plurality 42 of second pairs of luma-chroma samples.

According to such an embodiment, the encoder 10 and/or decoder 20 may be configured to determine the first set of luma samples by finding n=2 smallest luma values in said neighborhood of the current block, and/or determine the second set of luma samples by finding n=2 largest luma values in said neighborhood of the current block. By linking the corresponding chroma values, the encoder 10 and/or decoder 20 may obtain the n=2 first pairs of luma-chroma samples A, A' having the smallest luma values as well as the n=2 second pairs of luma-chroma samples B, B' having the largest luma values.

A corresponding example shall now be discussed with reference to FIG. 5 which shows a similar point cloud as previously discussed with reference to FIG. 4. Thus, differences to FIG. 4 will be described.

Figure 5:
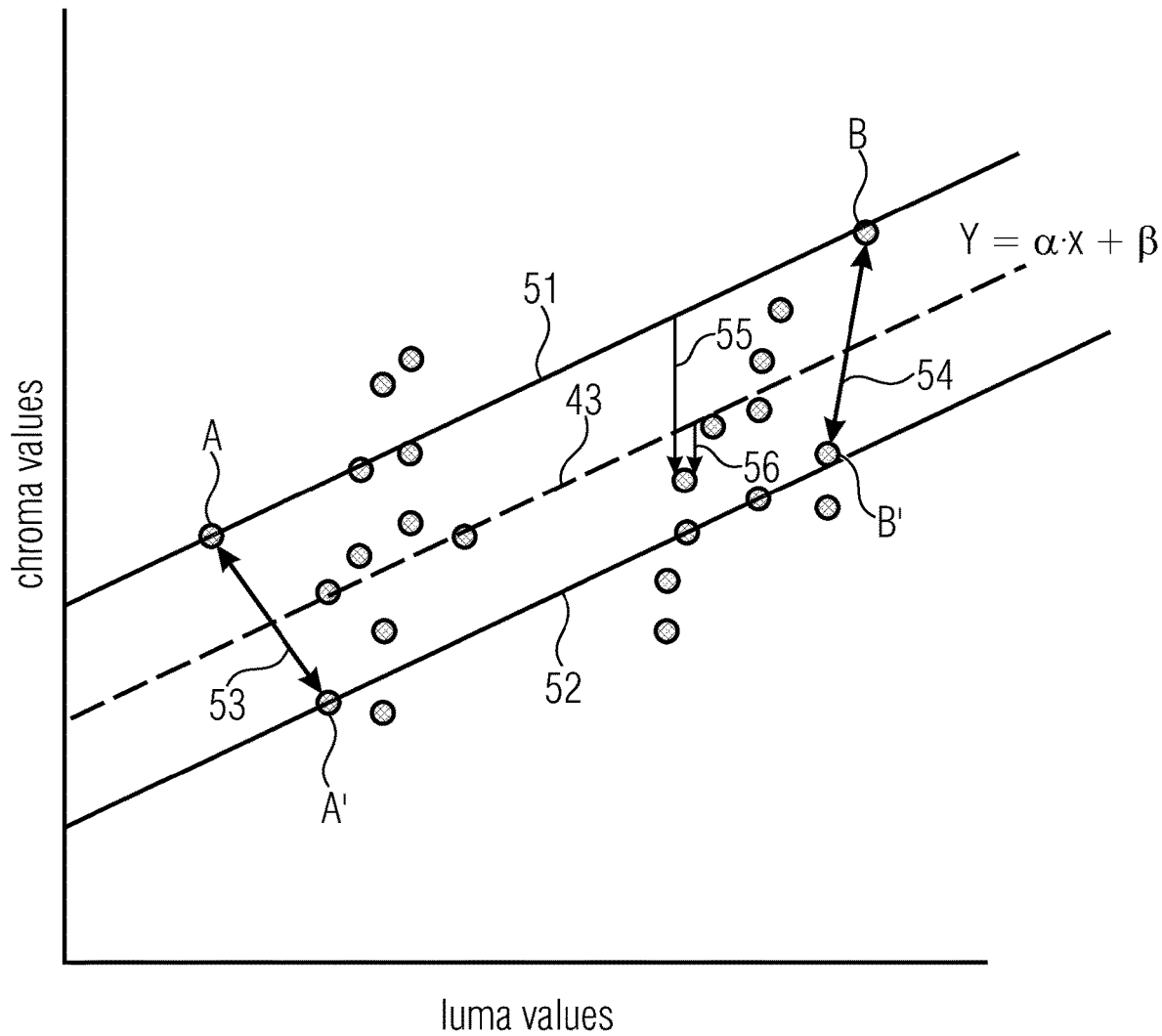
FIG. 5 shows an example using exactly two first pairs of luma-chroma samples and exactly two second pairs of luma-chroma samples for the straight-line fitting according to an embodiment.

In the example shown in FIG. 5, those two first pairs of luma-chroma samples A, A' having the smallest luma values and those two second pairs of luma-chroma samples B, B' having the largest luma values are selected by the encoder 10 and/or decoder 20 for fitting the straight-line 43 through said first and second pairs of luma-chroma samples A, A', B, B'.

As can be seen, a first temporary straight-line 51 may be fitted using the first pair of luma-chroma samples A having the smallest luma value and the second pair of luma-chroma samples B having the largest luma value. A second temporary straight-line 52 may be fitted using the first pair of luma-chroma samples A' having the second smallest luma value and the second pair of luma-chroma samples B' having the second largest luma value.

An average 53 between the two first pairs of luma-chroma samples A, A' having the smallest and the second smallest luma values, as well as an average 54 between the two second pairs of luma-chroma samples B, B' having the largest and the second largest luma values may be determined for fitting the straight-line 43 through the first and second pairs of luma-chroma samples A, A', B, B', i.e. for deriving the linear function $y = \alpha \cdot x + \beta$.

Thus, according to an embodiment, the encoder 10 and/or decoder 20 may be configured to fit the straight-line 43 so that said straight-line 43 extends through an average 53 of the first pairs of luma-chroma samples A, A' and an average 54 of the second pairs of luma-chroma samples B, B' for deriving the linear function of said straight-line 43.

In other words, it is proposed to search not only for the smallest luma value A and largest luma value B (as it is done in JVET-L0191) but also for the second-smallest luma value A' and the second-largest luma value B', as shown in FIG. 5. Then, the straight-line 43 can be fitted between the average 53 of the data points at A and A' and the average 54 of the data points at B and B', leading to the straight-line in FIG. 5 which generally leads to a better data-fit compared to conventional technology. Two variants of averaging A, A' and B, B' can be specified, differing in complexity:

1. accurate integer averaging: $(A+A'+1) \gg 1$, $(B+B'+1) \gg 1$, where ">>" is a bit-wise right-shift,
2. inaccurate integer averaging: $(A+A') \gg 1$, $(B+B') \gg 1$, saving four "+1" over the accurate variant.

Both variants represent fixed-point integer realizations of arithmetic averaging; other forms of averaging, such as geometric averaging, are possible as well but not considered here.

As can be clearly seen in FIG. 5, the straight-line 43 is fitted a lot better into the point cloud, i.e. into the plurality of first and second pairs of luma-chroma samples than it is the case in earlier proposals, which would be represented by the upper first temporary straight-line 51 only. The encoder 10 and/or decoder 20 may encode/decode luma sample residuals, whereas it can be seen that a prediction residual 55 predicted from the upper first temporary straight line 51 according to the earlier proposals may be significantly larger than a prediction residual 56 predicted from the straight-line 43 that has been fitted according to the inventive concept. Accordingly, the herein described inventive concept may significantly counteract the CCLM inaccuracy of earlier concepts.

Table 1 summarizes the algorithmic operations consumed by the herein described modified CCLM calculation in comparison with the previously adopted CCLM versions. It can be seen that, due to the search for two more extreme luma values A', B', the number of comparisons doubles. Note that the number of operations that may be performed by either of the proposed two variants is still much lower than that for the initial CCLM adopted in VTM 2 [1].

Bjøntegaard delta (BD) PSNR gains on the SDR-category Common Test Conditions (CTC) set of sequences [5] [6] were measured to verify the presence of significant coding efficiency increases without increases in codec runtime due to the proposed changes. VTM software version 3 with default configuration is used [4].

TABLE 1

Number of operations in different CCLM calculations.

| CCLM Config. | Multi-plies | Addi-tions | "Divi-sions" | Compari-sons | Sum excl. div. |
|---|---|---|---|---|---|
| VTM 2.x [1] | 2N + 2 | 7N + 3 | 2 | | 9N + 7 |
| VTM 3.x [2] | 1 | 3 | 1 | 2N | 2N + 4 |
| Proposed Variant 1 | 1 | 3 + 8 | 1 | 4N | 4N + 12 + 4* |
| Proposed Variant 2 | 1 | 3 + 4 | 1 | 4N | 4N + 8 + 4* |

N—number of chroma reference samples, *incl. right-shifts needed for averaging. Note that the actual CCLM application is not counted here.

Table 2 lists the BD-PSNR results for the above described averaging variant 1 (accurate integer averaging), whereas Table 3 contains the BD-PSNR values for averaging variant 2 (inaccurate integer averaging). It can be noted that both variants lead to very similar overall BD-PSNR performance, consistent BD-PSNR gains are reached for both chroma channels, no significant runtime increases are observed for either variant.

This indicates that both proposals as described herein successfully increase the chromatic coding efficiency by approximately 0.4% with, as desired, insignificant effect on the algorithmic complexity of the CCLM prediction tool.

TABLE 2

BD-PSNR [6] data for VTM 3.0.0 with vs. without proposed modification variant 1, SDR CTC [5].

| All Intra | Gain Y (%) | Gain Cb (%) | Gain Cr (%) | Time Enc. (%) | Time Dec. (%) |
|---|---|---|---|---|---|
| Class A1 | −0.12 | −0.25 | −0.17 | 101 | 98 |
| Class A2 | −0.11 | −0.42 | −0.34 | 101 | 99 |
| Class B | −0.05 | −0.41 | −0.56 | 100 | 98 |
| Class C | −0.05 | −0.45 | −0.40 | 100 | 99 |
| Class E | −0.02 | −0.25 | −0.28 | 100 | 99 |
| Overall | −0.07 | −0.37 | −0.37 | 100 | 99 |

| Random Access | Gain Y (%) | Gain Ch (%) | Gain Cr (%) | Time Enc. (%) | Time Dec. (%) |
|---|---|---|---|---|---|
| Class A1 | −0.09 | −0.33 | −0.40 | 100 | 104 |
| Class A2 | −0.05 | −0.34 | −0.15 | 100 | 99 |
| Class B | −0.02 | −0.39 | −0.61 | 99 | 97 |
| Class C | 0.00 | −0.39 | −0.19 | 99 | 96 |
| Class E | | | | | |
| Overall | −0.04 | −0.37 | −0.36 | 100 | 99 |

TABLE 3

BD-PSNR [6] data for VTM 3.0.0 with vs. without proposed modification variant 2, SDR CTC [5].

| All Intra | Gain Y (%) | Gain Cb (%) | Gain Cr (%) | Time Enc. (%) | Time Dec. (%) |
|---|---|---|---|---|---|
| Class A1 | −0.15 | −0.30 | −0.30 | 101 | 100 |
| Class A2 | −0.11 | −0.38 | −0.33 | 101 | 98 |
| Class B | −0.05 | −0.41 | −0.57 | 100 | 97 |
| Class C | −0.06 | −0.41 | −0.42 | 100 | 95 |
| Class E | −0.04 | −0.16 | −0.19 | 100 | 94 |
| Overall | −0.08 | −0.35 | −0.39 | 100 | 96 |

| Random Access | Gain Y (%) | Gain Cb (%) | Gain Cr (%) | Time Enc. (%) | Time Dec. (%) |
|---|---|---|---|---|---|
| Class A1 | −0.11 | −0.52 | −0.51 | 100 | 101 |
| Class A2 | −0.04 | −0.41 | −0.13 | 100 | 102 |
| Class B | −0.02 | −0.37 | −0.56 | 100 | 99 |
| Class C | 0.01 | −0.47 | −0.23 | 100 | 99 |
| Class E | | | | | |
| Overall | −0.03 | −0.44 | −0.37 | 100 | 100 |

Summarizing, two variants of a modification to the simplified cross-component linear model (CCLM) predictor described in L0191 are described herein. The suggested low-complexity changes stabilize the straight-line fitting algorithm in the CCLM, thus yielding BD-PSNR gains of 0.3-0.4% in the chroma channels. At the same time, the algorithmic complexity of the CCLM calculation remains only one half (or less for large CUs) of that of the CCLM design previously adopted in VTM 2 [1].

In particular, JVET-L0191 describes a simplified parameter calculation for the cross-component linear model (CCLM) predictor in the Versatile Video Coding (VVC) standard. According to this simplification, the CCLM parameters α and β can be derived by means of a straight-line fitting between a maximum and a minimum luma-chroma pair of sample values, as opposed to the previously used more complex linear regression from multiple luma and chroma samples. As a result, the algorithmic complexity of the CCLM tool is reduced without losing much coding efficiency.

The present invention provides evidence that the simplified line fitting between two extreme sample values is quite susceptible to statistical outliers and suggests some modifications to the CCLM method, as for example:

1. fitting of the straight line 43 between the average 54 of the largest two luma samples B, B' and the average 53 of the smallest two luma samples A, A' (instead of only the largest and only the smallest value), with accurate averaging, 2. fitting of the straight line 43 between the average 54 of the largest two luma samples B, B' and the average 53 of the smallest two luma samples A, A', with inaccurate averaging (no offset of 1 before division) saving some additions.

Variant 2 may yield the same BD-PSNR gains as variant 1 while requiring four additions less per CCLM coded CU.

However, both modifications have negligible impact on the VTM encoder and decoder complexity (encoder runtime 100%, decoder runtime 99-101%) and reportedly provide about 0.3-0.4% coding efficiency gain in each of the chromatic channels (Cb and Cr BD-PSNR gains for both all-Intra and random-access).

Figure 6:
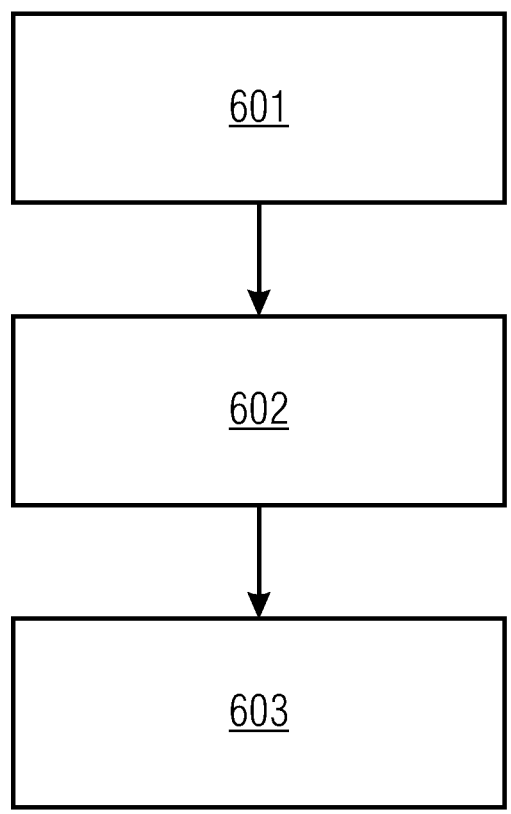
FIG. 6 shows a schematic block diagram of a method for block-based decoding according to an embodiment.

FIG. 6 shows a schematic block diagram of an embodiment of a method for block-based decoding of picture data of a picture, wherein decoding a current block of the picture comprises at least the following steps.

In block 601 a first set of luma samples and a second set of luma samples in a neighborhood of the current block are determined, wherein the first set of luma samples has smaller luma values than the second set of luma samples.

In block 602 a straight-line 43 having a linear function is fitted through first pairs of luma-chroma samples A, A' and second pairs of luma-chroma samples B, B', wherein the first pairs of luma-chroma samples A, A' are determined based on the first set of luma samples and first corresponding chroma samples in said neighborhood of the current block, and wherein the second pairs of luma-chroma samples B, B' are determined based on the second set of luma samples and second corresponding chroma samples in said neighborhood of the current block.

In block 603 chroma samples of the current block are predicted using luma samples of the current block and said linear function which has been determined from the neighborhood of the current block, as described above.

Figure 7:
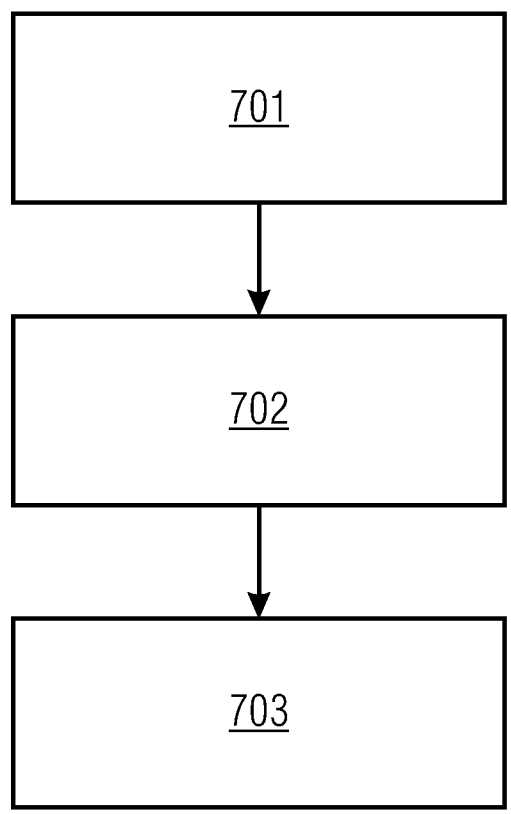
FIG. 7 shows a schematic block diagram of a method for block-based encoding according to an embodiment.
Figure 8:
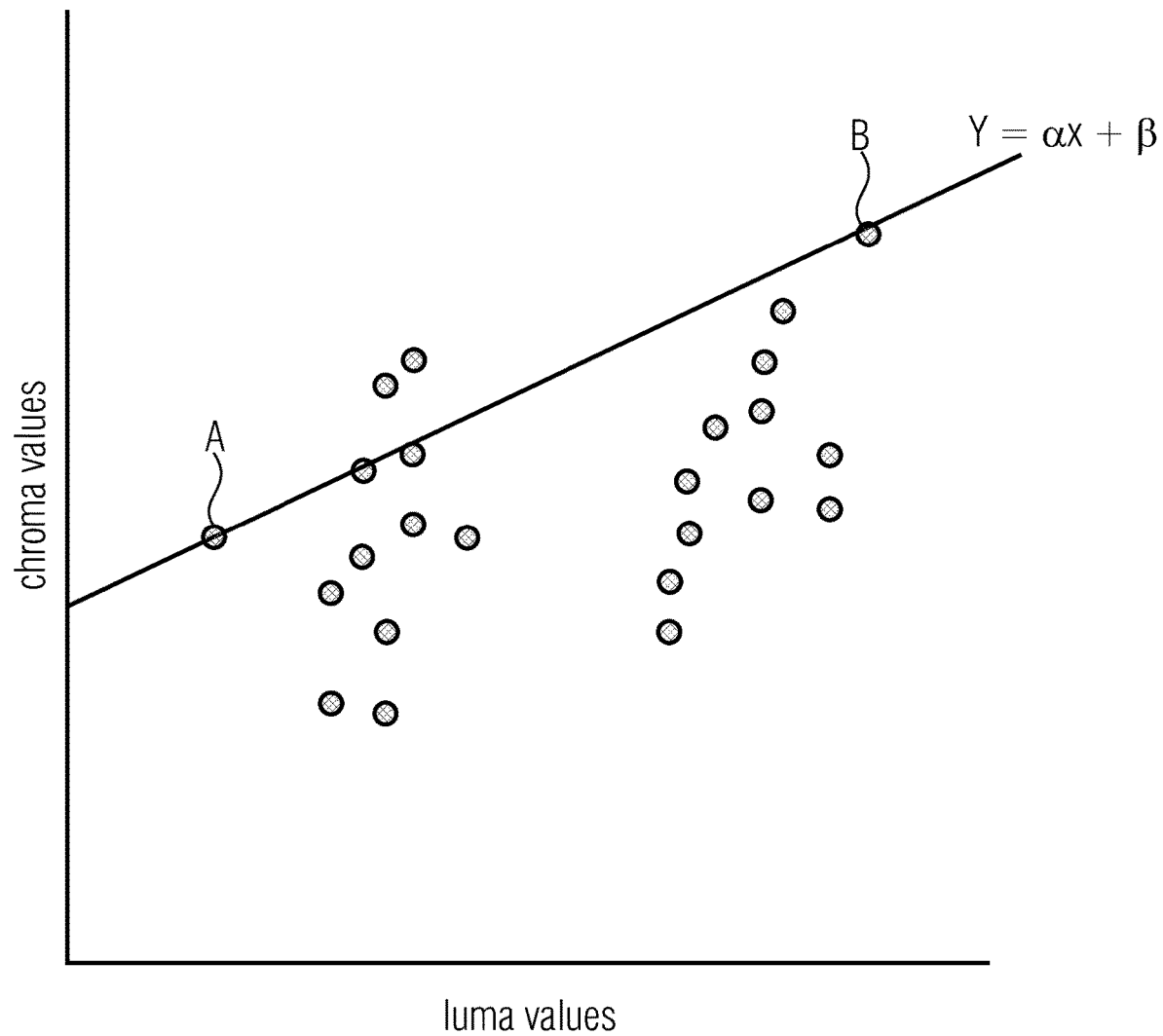
FIG. 8 is taken from [2] and shows a simplified cross-component linear model (CCLM) prediction method using exactly one first pair of luma-chroma samples and exactly one second pair of luma-chroma samples according to the conventional technology.

FIG. 7 shows a schematic block diagram of an embodiment of a method for block-based encoding of picture data of a picture, wherein encoding a current block of the picture comprises at least the following steps.

In block 701 a first set of luma samples and a second set of luma samples in a neighborhood of the current block are determined, wherein the first set of luma samples has smaller luma values than the second set of luma samples.

In block 702 a straight-line 43 having a linear function is fitted through first pairs of luma-chroma samples A, A' and second pairs of luma-chroma samples B, B', wherein the first pairs of luma-chroma samples A, A' are determined based on the first set of luma samples and first corresponding chroma samples in said neighborhood of the current block, and wherein the second pairs of luma-chroma samples B, B' are determined based on the second set of luma samples and second corresponding chroma samples in said neighborhood of the current block.

In block 703 chroma samples of the current block are predicted using luma samples of the current block and said linear function which has been determined from the neighborhood of the current block, as described above.

As discussed, both the decoder 20 and encoder 10 may determine a first set of luma samples and a second set of luma samples in a neighborhood of the current block 80, 82, 84. Said neighborhood may be the row(s) or column(s) of luma samples directly adjacent to said current block, advantageously (in image or video compression) the top neighboring row of samples or left neighboring column of samples. However, not necessarily all available adjacent luma samples may have to be considered in determining said first set of luma samples and said second set of luma samples. In other words, it may be sufficient to form a subset of all available adjacent luma samples for this purpose. In particular, the present invention remains applicable when only four neighboring luma samples are considered, in which case the first set of luma samples may comprise the n=2 smaller luma values out of the four considered values and the second set of luma samples may, consequently, comprise the n=2 larger luma values out of the four considered values.

The selection of these four neighboring luma samples in the neighborhood of the current block may be arbitrary, but advantageously, the four neighboring luma samples may be selected in an equidistant (or a nearly equidistant) fashion along the spatial top and/or left boundaries of the current block. Moreover, the selection of said four neighboring luma samples for the determination of the first set of luma samples and the second set of luma samples may be adapted according to the presence of a top neighboring row of samples and/or a left neighboring column of samples.

More specifically, if top vertical neighbors are not available (e.g. at the upper picture boundary), the four neighboring luma samples may all be selected from the left neighboring column of luma samples, whereas, if left horizontal neighbors are unavailable (e.g. at the left picture boundary), the four neighboring luma samples may all be selected from the top neighboring row of luma samples. If, however, both the top and left neighbors are available (as is the default case, e.g. at the center of the picture to be compressed), then two luma samples may be selected from the top neighboring sample row and two more luma samples may be selected from the left neighboring sample column. Finally, it should be noted that, if the picture is stored in a downsampled chroma format (e.g., 4:2:0), the neighboring luma samples may also be downsampled according to said chroma format prior to the selection of the (e.g. four) neighboring luma samples from which the first and second set of luma samples are determined.

Note that said neighborhood of the current block usually represents a previously decoded and reconstructed portion, e.g. block, of the current picture (spatial neighborhood) or another previously decoded and reconstructed picture (temporal neighborhood). However, it should be clear that, on the encoder side, the original input picture region, instead of the previously decoded and reconstructed picture region, may also be used as source for said neighborhood of the current block. Moreover, it should be readily apparent to those skilled in the art that the present inventive method is equally applicable to arbitrary cross-component prediction, e.g. prediction of green or blue from red components in RGB color coding.

Moreover, it should be noted that said sets of first/second pairs of luma-chroma samples may overlap (at least partially). This is especially the case when the decoded, reconstructed luma neighborhood of the current block consists of samples which all have the same value. Then, both the first and second pairs of luma-chroma samples may hold identical values. However, during "normal" operation on "natural" image content, this is rarely the case.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] K. Zhang, J. Chen, L. Zhang, M. Karczewicz, "Enhanced cross-component linear model intra prediction," JVET-D0110, 2016, http://phenix.it-sudparis.eu/jvet/doc_end_user/current_document.php?id=2806.
[2] G. Laroche, J. Taquet, C. Gisquet, P. Onno, "CE3-5.1: Cross-component linear model simplification," JVET-L0191, 2018, http://phenix.it-sudparis.eu/jvet/doc_end_user/current_document.php?id=4282.
[3] B. Bross, J. Chen, S. Liu, "Versatile Video Coding (Draft 2)," JVET-K1001, ver. 6/7, September/October 2018.
[4] Fraunhofer HHI, "VVCSoftware_VTM," https://vcgit.hhi.fraunhofer.de/jvet/VVCSoftware_VTM.
[5] F. Bossen, J. Boyce, X. Li, V. Seregin, K. Suhring, "JVET common test conditions and software reference configurations for SDR video," JVET-L1010, 2018.
[6] G. Bjøntegaard, "Calculation of average PSNR differences between RD-curves," VCEGM33, 2001.

The invention claimed is:

1. A decoder for block-based decoding of picture data of a picture, the decoder being configured to decode a current block of the picture by:
determining a first set of luma samples and a second set of luma samples in a neighborhood of the current block, the first set of luma samples comprising smaller luma values than the second set of luma samples, wherein the decoder is configured to:
determine the first set of luma samples by finding n=2 smallest luma values in said neighborhood of the current block, and
determine the second set of luma samples by finding n=2 largest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block; and
predicting chroma samples of the current block using luma samples of the current block and said linear function.

2. The decoder of claim 1, configured to:
reconstruct the luma samples of the current block by intra prediction and by inter prediction.

3. The decoder of claim 1, configured to:
decode luma sample residuals for the current block from a data stream; and
reconstruct the luma samples of the current block by intra prediction and inter prediction to acquire predicted luma samples and correcting said predicted luma samples using the luma sample residuals.

4. The decoder of claim 1, configured to:
fit the straight-line so that said straight-line extends through an average of the first pairs of luma-chroma samples and an average of the second pairs of luma-chroma samples for deriving the linear function of said straight-line.

5. The decoder of claim 1, wherein:
said linear function is given by the equation $y=\alpha \cdot x+\beta$, wherein $\alpha$ is a first cross-component linear model parameter representing a slope of said straight-line, $\beta$ is a second cross-component linear model parameter representing an offset of said straight-line, and
the decoder is further configured to:
predict for one or more luma samples x of the current block at least one corresponding chroma sample y of the current block using said linear function.

6. An encoder for block-based encoding of picture data of a picture into a data stream, the encoder being configured to encode a current block of the picture by:
determining a first set of luma samples and a second set of luma samples in a neighborhood of the current block, the first set of luma samples comprising smaller luma values than the second set of luma samples, wherein the encoder is configured to:
determine the first set of lima samples by finding n=2 smallest luma values in said neighborhood of the current block, and
determine the second set of luma samples by finding n=2 largest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block; and predicting chroma samples of the current block using luma samples of the current block and said linear function.

7. The encoder of claim 6, configured to:
encode luma sample residuals for the current block into the data stream, so that the luma samples of the current block are reconstructable by intra prediction and inter prediction to acquire predicted luma samples, wherein said predicted luma samples are correctable by using the luma sample residuals.

8. The encoder of claim 6, configured to:
fit the straight-line so that said straight-line extends through an average of the first pairs of luma-chroma samples and an average of the second pairs of luma-chroma samples for deriving the linear function of said straight-line.

9. The encoder of claim 6, wherein:
said linear function is given by the equation $y=\alpha \cdot x+\beta$, wherein $\alpha$ is a first cross-component linear model parameter representing a slope of said straight-line, $\beta$ is a second cross-component linear model parameter representing an offset of said straight-line, and
the encoder is further configured to
predict for one or more luma samples x of the current block at least one corresponding chroma sample y of the current block using said linear function.

10. A method for block-based decoding of picture data of a picture, wherein decoding a current block of the picture comprises:
determining a first set of luma samples and a second set of luma samples in a neighborhood of the current block, the first set of luma samples comprising smaller luma values than the second set of luma samples, wherein determining the first set of luma samples or the second set of luma samples comprises:
determining the first set of luma samples by finding n=2 smallest luma values in said neighborhood of the current block, and
determining the second set of luma samples by finding n=2 lamest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block; and
predicting chroma samples of the current block using luma samples of the current block and said linear function.

11. A method for block-based encoding of picture data of a picture,
wherein encoding a current block of the picture comprises:
determining a first set of luma samples and a second set of luma samples in a neighborhood of the current block, the first set of luma samples comprising smaller luma values than the second set of luma samples, wherein determining the first set of luma samples or the second set of luma samples comprises:
determining the first set of luma samples by finding n=2 smallest luma values in said neighborhood of the current block, and
determining the second set of luma samples by finding n=2 lamest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block; and
predicting chroma samples of the current block using luma samples of the current block and said linear function.

12. The method according to claim 11, further comprising:
generating a data stream comprising the chroma samples.

13. A non-transitory digital storage medium having a computer program stored thereon to perform a method for block-based decoding of picture data of a picture, wherein decoding a current block of the picture comprises:
determining a first set of luma samples and a second set of luma samples in a neighborhood of the current block, the first set of luma samples comprising smaller luma values than the second set of luma samples, wherein determining the first set of luma samples or the second set of luma samples comprises:
determining the first set of luma samples by finding n=2 smallest luma values in said neighborhood of the current block, and
determining the second set of luma samples by finding n=2 largest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples in said neighborhood of the current block; and
predicting chroma samples of the current block using luma samples of the current block and said linear function,
when said computer program is run by a computer.

14. A non-transitory digital storage medium having a computer program stored thereon to perform a method for block-based encoding of picture data of a picture, wherein encoding a current block of the picture comprises:
determining a first set of luma samples and a second set of luma samples in a neighborhood of the current block, the first set of luma samples comprising smaller luma values than the second set of luma samples, wherein determining the first set of luma, samples or the second set of luma samples comprises:
determining the first set of luma samples by finding n=2 smallest luma values in said neighborhood of the current block, and
determining the second set of luma samples by finding n=2 largest luma values in said neighborhood of the current block;
fitting a straight-line comprising a linear function through first pairs of luma-chroma samples and second pairs of luma-chroma samples, wherein the first pairs of luma-chroma samples are determined based on the first set of luma samples and first corresponding chroma samples in said neighborhood of the current block, and wherein the second pairs of luma-chroma samples are determined based on the second set of luma samples and second corresponding chroma samples of said neighborhood of the current block; and predicting chroma samples of the current block using luma samples of the current block and said linear function, when said computer program is run by a computer.

\* \* \* \* \*